United States Patent [19]

Henton et al.

[11] Patent Number: 5,194,494
[45] Date of Patent: Mar. 16, 1993

[54] HEAT RESISTANT THERMOPLASTIC POLYMER BLENDS

[75] Inventors: David E. Henton; Duane M. Naeger; F. Michael Plaver, all of Midland, Mich.; Robert S. Drzal, Naugatuck, Conn.

[73] Assignee: The Dow Chemical Company, Midland, Mich.

[21] Appl. No.: 484,152

[22] Filed: Feb. 23, 1990

[51] Int. Cl.$^5$ .............................. C08L 75/06
[52] U.S. Cl. ............................. 525/66; 525/942
[58] Field of Search ....................... 525/66, 942

[56] References Cited

U.S. PATENT DOCUMENTS

| | | | |
|---|---|---|---|
| 3,049,505 | 8/1962 | Grabowski | 525/66 |
| 3,970,717 | 7/1976 | Muller-Albrecht et al. | 260/37 |
| 3,984,607 | 10/1976 | Thoma et al. | 428/425 |
| 4,251,642 | 2/1981 | Tan et al. | 525/66 |
| 4,305,981 | 12/1981 | Muroi et al. | 428/31 |
| 4,317,890 | 3/1982 | Goyert et al. | 525/66 |
| 4,383,050 | 5/1983 | Nissen et al. | 521/114 |
| 4,855,355 | 8/1989 | Hirai et al. | 525/66 |
| 4,929,667 | 5/1990 | Ban et al. | 525/458 |
| 4,980,417 | 12/1990 | Biglione et al. | 525/125 |

FOREIGN PATENT DOCUMENTS

| | | |
|---|---|---|
| 0192230 | 7/1989 | European Pat. Off. |
| 2181352 | 8/1987 | Japan . |
| 3168450 | 7/1988 | Japan . |

OTHER PUBLICATIONS

"Modern Plastics Encyclopedia", Oct. 1984, vol. 61, No. 10A, (1984), pp. 6-7.

*Primary Examiner*—James J. Seidleck
*Assistant Examiner*—Thomas Hamilton, III
*Attorney, Agent, or Firm*—James B. Guffey

[57] ABSTRACT

Polymer blend compositions having an advantageous combination of low temperature toughness, solvent resistance, scratch resistance, paintability and elevated temperature resistance comprise from about 20 to about 65 weight percent of a rubber modified monovinylidene aromatic/ethylenically unsaturated nitrile/N-arylmaleimide copolymer and from about 35 to about 80 weight percent of certain selected polyester-based elastomeric thermoplastic polyurethane ingredients. The resulting polymer blend compositions are especially well suited for use in the preparation of molded articles or thermoformed sheet materials intended for use in relatively low temperature environments including, for example, in various motor vehicle and/or recreational vehicle applications, as freezer and refrigerator liners, snow removal equipment housings or accessories, and the like.

19 Claims, No Drawings

HEAT RESISTANT THERMOPLASTIC POLYMER BLENDS

BACKGROUND OF THE INVENTION

The present invention pertains generally to polymer blend compositions which comprise a rubber modified monovinylidene aromatic polymer in combination with particular proportions of certain selected elastomeric thermoplastic polyurethane ingredients and which are particularly well suited for use in various extrusion compounding, injection molding, blow molding and sheet extrusion/thermoforming end-use applications The general concept of blending urethane polymers and butadiene rubber modified styrene acrylonitrile (ABS) polymers is disclosed in U.S. Pat. No. 3,049,505. Other U.S. Patents which deal generally with the subject of blends of polyurethane materials with thermoplastic polymer ingredients such as ABS resins include U.S. Pat. No. 4,317,890 which is concerned with blends comprising from 75 to 97 weight percent of a thermoplastic polyurethane in combination with from 3 to 25 weight percent of a relatively lightly grafted graft copolymer and U.S. Pat. No. 4,342,847 which is directed to a method for producing blends of thermoplastic polyurethanes with other thermoplastic materials by way of an in-situ polymerization/blending process wherein from 35 to 96 parts by weight of the polyurethane ingredient is polymerized in an extruder and in the presence of from 4 to 65 parts by weight of a previously formed thermoplastic polymer ingredient. U.S. Pat. No. 4,179,479 to Carter is also concerned with thermoplastic polyurethane compositions optionally containing as much as about 60 weight percent of various other thermoplastic polymer ingredients such as emulsion polymerized ABS compositions, polyoxymethylenes, polycarbonate, etc.

Additional references dealing with the subject of polymer blend compositions containing rubber modified thermoplastics such as ABS resins in combination with various urethane polymer ingredients include published Japanese patent application numbers J51-126,245-A J60-067,219-A and J61-152,760-A.

SUMMARY OF THE INVENTION

It has now been discovered that polymer blend compositions having a particularly desirable and advantageous combination of properties such as, for example, low temperature toughness, solvent resistance, scratch resistance, paintability and heat distortion characteristics can be suitably provided in the form of compositions comprising one or more rubber modified, N-arylmaleimide-containing monovinylidene aromatic copolymer ingredients in combination with appropriate proportions of certain selected elastomeric thermoplastic polyurethane materials. Accordingly, the present invention in one of its aspects is a polymer blend composition comprising from about 20 to about 65 weight percent of a rubber modified monovinylidene aromatic-/ethylenically unsaturated nitrile/N-arylmaleimide copolymer and from about 35 to about 80 weight percent of a polyester-based elastomeric thermoplastic polyurethane having a polyester-based soft segment content of at least about 50 weight percent on a thermoplastic polyurethane weight basis and having a Shore Hardness rating of less than 90 on the A scale.

As used herein, the term "soft segment" refers to the relatively high molecular weight glycol or "macroglycol" constituent employed in the preparation of the elastomeric thermoplastic polyurethane ingredient hereof. The term "polyester-based" as used herein in connection with the polyurethane soft segment description is intended to connote the fact that said soft segment is at least predominantly (i.e., greater than 50 percent on a soft segment weight basis) composed of ester linked macroglycol repeating units, with the remainder of said repeating units (if any) typically being ether linked repeat units. Preferably, said polyurethane soft segment is exclusively (i.e., 100%) or almost exclusively (e.g., 75 percent or more, preferably 85 or 90 percent or more) composed of the indicated ester linked macroglycol repeating units.

In one of its especially preferred embodiments, the subject polymer blend composition employs as its rubber modified monovinylidene aromatic/ethylenically unsaturated nitrile/N-arylmaleimide copolymer ingredient one which comprises (a) a graft copolymer comprising, in polymerized form and on a graft copolymer weight basis, from about 55 to about 99 weight percent of a monovinylidene aromatic monomer: from about 1 to about 45 weight percent of an ethylenically unsaturated nitrile monomer: and from 0 to about 35 weight percent of an N-aryl-maleimide monomer, said graft copolymer being grafted to a rubbery substrate polymer: and (b) a matrix polymer comprising, in polymerized form and on a matrix polymer weight basis, from about 55 to about 97 weight percent of a monovinylidene aromatic monomer; from about 1 to about 45 weight percent of an ethylenically unsaturated nitrile monomer: and from about 2 to about 35 weight percent of an N-aryl maleimide monomer ingredient.

In another of its preferred embodiments, the subject polymer blend composition employs as its requisite rubber modified monovinylidene aromatic/ethylenically unsaturated nitrile/N-arylmaleimide copolymer ingredient one which has been prepared by a mass, solution, mass/suspension or mass/solution graft polymerization technique and which may optionally further comprise, on a total blend composition weight basis (i.e., the combined weight of the indicated thermoplastic polyurethane and rubber modified monovinylidene aromatic copolymer ingredients), up to about 30 (preferably from 1 to about 30 and more preferably from about 5 to about 25) weight percent of a relatively high rubber content emulsion polymerized rubber modified graft copolymer ingredient. These latter compositions (i.e., containing from 1 to about 30 weight percent of the indicated relatively high rubber content emulsion polymerized graft copolymer ingredient) have especially beneficial low temperature impact strength characteristics.

The polymer blend compositions hereof exhibit notably improved (i.e., higher) heat distortion characteristics relative to that which is obtained when a conventional rubber-modified binary monovinylidene aromatic/unsaturated nitrile copolymer is employed as the rubber-modified copolymer ingredient. In addition, such polymer blend compositions also exhibit surprisingly better compatibility with the elastomeric polyurethane ingredient, and substantially enhanced low temperature toughness, than is the case when a polyether-based polyurethane, or when a mixed polyether/polyester-based polyurethane having its soft segment content predominantly composed of polyether repeating units, is instead used as the elastomeric polyurethane ingredient.

The blends of the present invention are also characterized as having a continuous phase of the indicated elastomeric thermoplastic polyurethane ingredient with the rubber-modified monovinylidene aromatic copolymer ingredient constituting either a co-continuous or dispersed phase therein Such blends are particularly well suited for use in the manufacture of molded articles intended for use in relatively low temperature environments such as in motor vehicle and recreational vehicle applications, as freezer and refrigerator liners, as housings, parts or accessories for snow removal equipment and the like.

DETAILED DESCRIPTION OF THE INVENTION

Rubber modified monovinylidene aromatic copolymers suitable for use herein include those which are graft copolymer compositions wherein rubbery polymer particles serve as substrates having a monovinylidene aromatic/ethylenically unsaturated nitrile copolymer grafted thereto as a grafted superstrate and wherein the remainder of said monovinylidene aromatic copolymer comprises a monovinylidene aromatic/ethylenically unsaturated nitrile/N-arylmaleimide copolymer and constitutes a continuous matrix phase in which the indicated grafted rubbery particles are dispersed. In such instances, the matrix phase typically constitutes from about 40 to about 95 (preferably from about 60 to about 85) percent of the overall weight of the indicated rubber-modified monovinylidene aromatic copolymer ingredient and the grafted copolymer constituents (i.e. including rubber, grafted copolymer and occluded copolymer) constitutes the remainder thereof Typically the grafted copolymer constituent will have a grafted superstrate to graftable rubber substrate ratio (i.e., a graft to rubber or "G/R" ratio) of from about 0.1:1 to about 2:1 (preferably from about 0.25:1 to about 0.8:1). The dispersed rubbery polymer particles within such copolymer will typically have an overall volume average particle size of from about 0.02 to about 10 (preferably from about 0.05 to about 5.0) microns.

In certain preferred embodiments hereof, the dispersed rubbery polymer particles are of a sort which have a bimodal particle size distribution in which the indicated rubbery particles are largely composed (e.g., from about 40 to about 90, preferably from about 50 to about 75, weight percent on a total rubbery particle weight basis) of particles having a particle size of less than 0.5 micron (preferably from about 0.05 to about 0.45 micron) and wherein the remainder of said rubbery particles (e.g., from 10 to about 60, preferably from 25 to about 50, weight percent thereof) have a particle size of about 0.5 micron or greater (preferably from about 0.5 to about 5 micron). Additionally, three or more distinct types and/or sizes of rubber particles can also suitably employed as the dispersed rubbery particles herein.

Monovinylidene aromatic monomers suitable for use in the aforementioned rubber-modified monovinylidene aromatic/ethylenically unsaturated nitrile copolymers include styrene, alkyl substituted styrenes such as alpha-alkyl-styrene (e.g., alpha-methylstyrene, alpha-ethylstyrene etc.), various ring-substituted styrenes such as ortho or para-methylstyrene, ortho-ethylstyrene, 2,4-dimethylstyrene, etc., ring-substituted halo-styrenes such as chloro-styrene, 2,4-dichloro-styrene, etc. and the like. Such monovinylidene aromatic monomer (especially styrene) typically constitutes from about 55 to about 99 weight percent of said monovinylidene aromatic copolymer and preferably constitutes from about 60 to about 95 (more preferably from about 65 to about 90) weight percent thereof. Such monovinylidene aromatic copolymers are typically normally solid, hard (i.e., non-elastomeric) materials having a glass transition temperature in excess of 25° C.

Suitable ethylenically unsaturated nitrile monomer ingredients for use, typically as a minor constituent in (i.e., constituting from about 1 to about 45, preferably from 5 to 40 and more preferably from 10 to 35, weight percent of) the indicated monovinylidene aromatic copolymers include acrylonitrile, methacrylonitrile, ethacrylonitrile, fumaronitrile etc.

The indicated rubber modified monovinylidene aromatic copolymers can also optionally contain additional monomer ingredients, typically in relatively minor proportions such as, for example, from about 1 to about 25 (preferably from about 2 to about 15) weight percent on a rubber modified monovinylidene aromatic copolymer weight basis Examples of such suitable optional monomer ingredients include ethylenically unsaturated anhydrides such as maleic anhydride; ethylenically unsaturated amides such as acrylamide, methacrylamide, etc.; esters (especially lower, e.g., $C_1-C_6$, alkyl esters) of ethylenically unsaturated carboxylic acids such as methyl methacrylate, ethylacrylate, hydroxyethylacrylate, n-butyl acrylate or methacrylate, 2-ethyl-hexylacrylate, etc.; and the like.

As has been noted above, the rubber-modified monovinylidene aromatic copolymers employed herein comprise, at least in the monovinylidene aromatic copolymer matrix portion thereof and in polymerized form, from about 2 to about 35 (preferably from about 5 to about 25 weight percent (on a matrix copolymer weight basis) of an N-aryl maleimide monomer ingredient. Examples of suitable such N-arylmaleimide monomers include N-phenyl maleimide, N-(4-diphenyl) maleimide, N-naphthyl maleimide, N-(lower alkyl-substituted phenyl) maleimides, N-(halo-substituted phenyl) maleimides, and the like. Especially preferred for such usage is N-phenyl maleimide and it can be further noted that any of the various indicated N-aryl maleimide monomers can also be beneficially utilized (again typically in a relatively minor proportion on a by weight basis) as an optional comonomer within the grafted monovinylidene aromatic copolymer superstrate portion of the subject rubber modified monovinylidene aromatic copolymer ingredient.

Preferably, the matrix phase portion of the above-described rubber modified monovinylidene aromatic copolymer has a solubility parameter of from about 9.0 to about 10.2 (especially from about 9.2 to about 10.0) cal$^{\frac{1}{2}}$/mole cm$^{3/2}$ as calculated pursuant to the method described in *Polymer Blends*, Academic Press, pp 45–48, 1978, edited by D. R Paul and S. Newman.

Suitable rubbery polymer materials for use as the dispersed rubbery particles within the rubber modified monovinylidene aromatic copolymers hereof include homopolymers of 1,3-conjugated alkadiene monomers; copolymers of from about 60 to about 99 weight percent of said 1,3-conjugated alkadienes with from about 1 to about 40 weight percent of one or more monoethylenically unsaturated monomers such as, for example, monovinylidene aromatic monomers (e.g., styrene, etc.), ethylenically unsaturated nitriles such as acrylonitrile, methacrylonitrile, etc., alkyl acrylates or methacrylates such as methyl methacrylate, and the like; ethylene/propylene copolymer rubbers and rubbery ethylene/propylene/non-conjugated diene copolymers; rubbery acrylate homopolymers and copolymers; and the like. Especially preferred rubbery copolymers for use herein include polymers composed of from about 60 to 100 weight percent of 1,3-butadiene and from 0 to about 40 weight percent of styrene and/or acrylonitrile. Typically, the indicated rubbery polymer materials are of a sort which have a glass transition temperature of −20° C. or lower and, preferably, said materials have a glass transition temperature of −30° C. or lower.

Rubber modified monovinylidene aromatic copolymers employed herein will typically comprise from about 3 to about 40 (preferably from about 5 to about 35, and most preferably from about 10 to about 30) weight percent of the above-discussed dispersed rubbery polymer on a rubber modified monovinylidene aromatic copolymer total weight basis Within the above-stated ranges, the relatively higher rubber contents impart greater low temperature toughness to the resulting polymer blends.

The aforementioned rubber modified monovinylidene aromatic graft copolymer hereof can suitably be prepared in any known manner by free radical polymerization of the selected comonomer materials in the presence of the modifying rubber material Suitable techniques thus include conventional mass, solution, suspension or the more commonly used emulsion polymerization processes. Especially preferred for use herein are rubber-modified monovinylidene aromatic graft copolymers prepared via the mass process which includes the various known modified mass processes of solution, mass/solution and mass/suspension polymerization techniques.

One particularly preferred embodiment of the present invention involves the use as the requisite rubber modified monovinylidene aromatic copolymer constituent a mixture or blend of a predominant proportion (e.g., from about 50 to about 95, preferably from about 60 to about 90, weight percent) of a mass, solution, mass/solution or mass/suspension polymerized rubber modified monovinylidene aromatic copolymer ingredient in combination with a relatively minor proportion (e.g., from about 5 to about 50, preferably from about 10 to about 40, weight percent) of a relatively high rubber content emulsion polymerized rubber modified graft copolymer ingredient. In such instances, the dispersed rubbery particles associated with the emulsion polymerized graft copolymer ingredient will typically have an overall volume average particle size of from about 0.03 to about 1.5 (preferably from about 0.05 to about 0.8) micron and will constitute from about 10 to about 90 (preferably about 20 to about 80) weight percent of the total dispersed rubbery polymer particle content within the rubber modified monovinylidene aromatic copolymer in question. The particle size distribution of said emulsion polymerized graft copolymer particles can be monomodal or can, if desired in a given instance or for a particular purpose, be of a bimodal or multimodal size distribution.

The dispersed rubbery polymer particles of the mass, solution, mass/solution or mass/suspension polymerized component will typically have a volume average particle size of from about 0.4 to about 6 (preferably from about 0.7 to about 5) microns; will generally constitute from about 1 to about 35 (preferably from about 5 to about 25) percent of the weight of such component; can be of a monomodal, bimodal or multimodal size distribution; and will generally constitute from about 90 to about 10 (preferably from about 80 to about 20) weight percent of the total dispersed rubbery polymer content therein.

Suitable relatively high rubber content emulsion polymerized graft copolymer ingredients (also hereinafter referred to as "grafted rubber concentrates") for use herein include those wherein the grafted superstrate polymer thereof is a monovinylidene aromatic/ethylenically unsaturated nitrile copolymer or a monovinylidene aromatic/ethylenically unsaturated nitrile/N-arylmaleimide copolymer of the sort which have hereinbefore been more fully discussed and described. Also suitable for use as the grafted rubber concentrate ingredient herein are those wherein the grafted superstrate polymer is different from the above discussed monovinylidene aromatic/unsaturated nitrile copolymer and thus include those rubber concentrate ingredients wherein the grafted superstrate polymer is an acrylate or methacrylate polymer such as polymethyl methacrylate, the various methyl methacrylate copolymers and the like.

Typically, the indicated relatively high rubber content emulsion polymerized graft copolymer ingredient will have a rubber content of from about 35 to about 85 (especially from about 45 to about 80) weight percent on an emulsion polymerized graft rubber concentrate weight basis. The rubbery polymer constituent of such emulsion polymerized graft copolymer can be the same as or different from that employed in the mass, solution, mass/suspension or mass/solution polymerized graft copolymer component in a given instance and can be selected from the same group of rubbery polymer materials that have been described and discussed hereinbefore.

Also suitable for use as the rubber modified, N-arylmaleimide-containing monovinylidene aromatic/ethylenically unsaturated nitrile copolymer ingredient hereof are those prepared by simply blending a relatively high rubber content emulsion polymerized rubber modified graft copolymer ingredient of the sort described above with a separately prepared non-rubber modified monovinylidene aromatic/ethylenically unsaturated nitrile/N-arylmaleimide matrix copolymer ingredient, the latter of which can be suitably prepared by conventional emulsion, mass, solution, mass/suspension or mass/solution polymerization techniques.

As has been noted above, the above-described rubber modified monovinylidene aromatic copolymer ingredient typically constitutes from about 20 to about 65 weight percent of the subject polymer blend compositions. In preferred instances, however, said ingredient constitutes from about 25 to about 60 (more preferably from about 40 to about 60) weight percent of such compositions.

In contrast to the various prior art rubber modified monovinylidene aromatic copolymer/thermoplastic polyurethane blend compositions wherein the nature of the polyurethane ingredient employed is apparently not particularly critical for the purposes contemplated therein, it has been found for the purpose and in the context, of the present invention to be essential that the elastomeric thermoplastic polyurethane employed be a polyester-based material prepared from a diisocyanate; a soft segment polyol or "macroglycol" component predominantly composed of polyester (especially polycaprolactone) repeating units; and a chain extender. More specifically, it has been found that the nature and amount of the thermoplastic polyurethane's soft segment is critical in order to obtain the desired low temperature (e.g. −20° F. or below) toughness properties within the subject polymer blends and, in particular, that only thermoplastic polyurethanes containing at least about 50 weight percent of a polyester-based soft segment on a polyurethane weight basis impart the desired level of low temperature toughness to the resulting polymer blends. In this connection, it has also been found that polyether-based (i.e., wherein the soft segment thereof is composed of 50 weight percent or greater of ether linked repeating units) polyurethanes, and even polyester-based polyurethanes having Shore A hardness of 90 or harder, result in low temperature toughness characteristics which are unacceptable for the present invention's purposes.

An especially preferred group of polyester-based elastomeric thermoplastic polyurethanes for use in the present invention include those which are the reaction products of: (i) 4,4′methylenebis(phenyl isocyanate); (ii) polycaprolactone or a polyester of adipic acid and a glycol having at least one primary hydroxyl group (especially polycaprolactone soft segment polyols); and (iii) a relatively low molecular weight difunctional chain extender having 2 active hydrogen-containing groups which are reactive with isocyanate groups.

In preparing an adipic acid-based polyester polyol soft segment, the adipic acid is condensed with a suitable glycol or mixture of glycols which have at least one primary hydroxyl group. The condensation is stopped when an acid number of from about 0.5 to about 2.0 is reached. The water formed during the reaction is removed simultaneously therewith or subsequently thereto such that the final water content is from about 0.01 to about percent 0.2, preferably from about 0.01 to 0.05 percent.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol and the like or combinations thereof. In addition to the glycols, a small amount of trihydric alcohol up to about 1 percent may be used along with the glycols such as, for example, trimethylolpropane, glycerine, hexanetriol and the like. The resulting hydroxyl polyester has a molecular weight of at least about 500, a hydroxyl number of about 25 to about 190 and preferably between about 40 and about 60, and an acid number of less than about 2 and a water content of less than about 0.2 percent.

Suitable chain extending agents for use in preparing the polyester-based elastomeric thermoplastic polyurethanes for use herein include any difunctional compounds containing two active hydrogen-containing groups which are reactive with isocyanate groups. Examples of such suitable chain extending agents thus include diols including ethylene glycol, propylene glycol, butylene glycol, 1,4-butanediol, butenediol, butynediol, xylylene glycols, amylene glycols, 1,4-phenylene-bis-β-hydroxyethyl ether, 1,3-phenylene-bis-β-hydroxy ethyl ether, bis-(hydroxy-methyl-cyclohexane), hexanediol, thiodiglycol and the like; diamines including ethylene diamine, propylene diamine, butylene diamine, hexamethylene diamine, cyclohexalene diamine, phenylene diamine, tolylene diamine, xylylene diamine, 3,3′-dichlorobenzidine, 3,3′-dinitrobenzidine and the like; alkanol amines such as, for example, ethanol amine, aminopropyl alcohol, 2,2-dimethyl propanol amine, 3-aminocyclohexyl alcohol, p-aminobenzyl alcohol and the like. If desirable, a small amount of trifunctional or higher polyfunctional material may be utilized. Such polyfunctional chain extender, however, should not be present in an amount greater than about 1 percent by weight. Any suitable polyfunctional compound may be used for such purpose such as, for example, glycerine, trimethylolpropane, hexanetriol, pentaerythritol and the like.

Although thermoplastic polyurethanes based upon polycaprolactone or adipate polyesters are generally preferred for use herein, other polyester-based thermoplastic polyurethanes can also be suitably employed within the present invention such as, for example, those in which there is employed (in place of the adipic acid) succinic acid, suberic acid, sebacic acid, oxalic acid, methyl adipic acid, glutaric acid, pimelic acid, azelaic acid, phthalic acid, terephthalic acid, isophthalic acid and the like as well as those prepared using hydroxycarboxylic acids such as 3-hydroxy-butyric acid in place of the adipic acid or caprolactone component.

While 4,4′-methylene bis (phenyl isocyanate) is an especially preferred diisocyanate species for use in preparing the elastomeric polyurethane ingredients for use herein, other diisocyanate which can be noted as also being suitable for such purpose include ethylene diisocyanate, ethylidene diisocyanate, propylene diisocyanate, butylene diisocyanate, cyclopentylene-1,3-diisocyanate, cyclohexylene-1,4-diisocyanate, 2,6-tolylene diisocyanate, 2,2-diphenylpropane-4,4′-diisocyanate, P-phenylene diisocyanate, m-phenylene diisocyanate, xylylene diisocyanate, 1,4-naphtylene diisocyanate, 1,5-naphthylene diisocyanate, diphenyl-4,4′-diisocyanate, azobenzene-4,4′diisocyanate, diphenyl sulfone-4,4′diisocyanate, dichlorohexamethylene diisocyanate, tetramethylene diisocyanate, pentamethylene diisocyanate, hexamethylene diisocyanate, 1-chlorobenzene-1,4-diisocyanate, furfurylidene diisocyanate and the like.

The aforementioned types of polyester-based thermoplastic polyurethanes are generally known materials. Suitable methodology for the preparation thereof is disclosed within Column 7 of U.S. Pat. No. 4,665,126 and is incorporated herein by reference.

As has been noted above, the polyester-based thermoplastic polyurethanes suitable for use herein are those which have a Shore A Hardness of less than 90 as determined pursuant to ASTM D2240 and those which are particularly preferred for use herein have a Shore A Hardness of about 85 less or (especially about 80 or less) as determined pursuant to the same standard test method.

It can also be noted that such polyester-based elastomeric polyurethanes typically employ a polyester polyol soft segment component having a molecular weight of from about 500 to about 5,000 (preferably from about 1,000 to about 3,000) and that such soft segment constitutes at least about 50 (preferably from about 55 to about 75) percent of the total weight of the resulting polyester-based thermoplastic polyurethane ingredient.

It is generally preferred that the elastomeric thermoplastic polyurethanes employed herein be of a sort wherein the polyester-based soft segment thereof has a solubility parameter of from about 8.7 to about 10.2

(preferably from about 9.0 to about 10.0) cal$^{\frac{1}{2}}$/mole cm$^{3/2}$ as calculated pursuant to the method identified hereinbefore in connection with the monovinylidene aromatic copolymer ingredient. It is also generally preferred that the ratio of the aforementioned monovinylidene aromatic copolymer matrix phase solubility parameter to that of the thermoplastic polyurethane soft segment be from about 1.00:0.88 to about 1.00:1.17, preferably from about 1.00:0.92 to about 1.00:1.11.

Typically, the amount of the above-described thermoplastic polyurethane ingredient employed within the subject polymer blend compositions is from about 35 to about 80 weight percent on a total composition weight basis. Preferred compositions hereof include those wherein said thermoplastic polyurethane ingredient constitutes from about 40 to about 75 (more preferably from about 40 to about 60) weight percent of the indicated polymer blend compositions.

Methods suitable for the preparation of the subject polymer blend compositions include conventional extrusion compounding techniques utilizing separately prepared rubber modified monovinylidene aromatic copolymer and thermoplastic polyurethane ingredients and also include simultaneous compounding/polymerization techniques of the sort described in U.S. Pat. No. 4,342,847 wherein the thermoplastic polyurethane is polymerized insitu within an extruder and in the presence of the rubber modified monovinylidene aromatic copolymer ingredient.

The polymer blend compositions hereof can also optionally contain additional conventional additives of ingredients such as lubricants, stabilizers, dyes, pigments, organic or inorganic fillers or fibers and the like.

The resulting polymer blend compositions hereof are useful in the preparation of a wide variety of injection molded or thermoformed thermoplastic articles. However, due to the excellent low temperature toughness characteristics of such compositions, they are especially well suited for various motor vehicle, recreational and appliance applications which involve periodic exposure to or continuous or prolonged use at relatively low ambient temperatures.

The present invention is further understood and illustrated by reference to the following examples thereof in which all parts and percentages are on a weight basis unless otherwise indicated.

EXAMPLE 1

In this series of experiments, two different ABS resins are extrusion compounded with a polyester-based elastomeric thermoplastic polyurethane (TPU-1) having a Shore A Hardness rating of 80 and containing 60.1 weight percent of a polycaprolactone soft segment having an average molecular weight of about 2,000. The soft segment polycaprolactone solubility parameter is 9.2 cal$^{\frac{1}{2}}$/mole cm$^{3/2}$.

The composition of the resulting polymer blends and the distortion temperature under load (DTUL), heat sag and −20° F. Izod Impact strength values thereof are set forth in Table I. For comparative purposes, the −20° F. Izod Impact strength for the ABS-2 composition is also presented in Table I.

TABLE I

| Sample | Composition (Weight Percent) | DTUL[3] (°F.) at 66 psi | Heat Sag[4] (in) 185° F. | Notched Izod[5] (ft-lb/in) −20° F. |
|---|---|---|---|---|
| Example 1 | 45% TPU-1 55% ABS-2[2] | 172 | 0.157 | 15.8[7] |
| Experiment A | 100% ABS-2 | — | — | 1.9[8] |
| Experiment B | 45% TPU-1 55% ABS-1[1] | 165 | 0.335 | 8.4[6] |

[1]ABS-1 = A mass/solution polymerized ABS containing 12 percent of an anionically polymerized butadiene rubber, 25 percent acrylonitrile and 63 percent styrene. Rubber particle size is 0.7 microns (volume average).
[2]ABS-2 = A mixture of 80.3 percent of a mass/solution polymerized styrene/acrylonitrile/N-phenylmaleimide (66/22/12) ABS containing 7.6 percent of anionically polymerized butadiene rubber (volume average particle size = 2–3 micron and 36 weight percent gel content) and 19.7 percent of an emulsion grafted 0.12 micron volume average particle size rubber modifier wherein said modifier contains 51 percent rubber which is grafted with a 72/28 weight ratio styrene/acrylonitrile copolymer in a graft to rubber (G/R) ratio of 0.3.
[3]Distortion temperature under load as per ASTM D-645 at 66 psi using unannealed 0.125 inch thick × 0.5 inch wide test specimens.
[4]Sag in inches after 30 minutes at 185° F. using a 0.125 inch thick tensile bar and a 4.5 inch overhang.
[5]ASTM D-256.
[6]40 percent brittle breaks and 60 percent ductile breaks.
[7]100% ductile breaks.
[8]100% brittle breaks.

As can be seen from the results in Table I, the polymer blend composition of Example 1 (i.e., which is based upon the N-phenylmaleimide-containing ABS component, i.e., ABS-2) has higher heat distortion temperature and reduced heat sag at 185° F. than does the Experiment B composition. As can also be seen, the TPU-containing Example 1 composition has a substantially higher −20° F. notched izod value than the comparative Experiment A composition.

EXAMPLES 2-9

In this series of experiments, the ABS-2 ingredient of Example 1 above is extrusion compounded with varying proportions of various different polyester-based thermoplastic polyurethane ingredients having different types and different relative amounts of polyester polyol soft segments and having different Shore Hardness ratings The compositional details and the Notched Izod impact strengths of the resulting compositions at various temperatures are set forth in Table II. Also set forth in Table II are comparative compositions which employ either polyether-based thermoplastic polyurethanes or polyester-based thermoplastic polyurethanes having Shore Hardness values that are too high for the purposes of the present invention or which employ the requisite type (i.e., in terms of Shore Hardness) of polyester-based thermoplastic polyurethane ingredient but in a proportion which is too low for the present invention's purposes.

The various elastomeric thermoplastic polyurethane (TPU) ingredients employed in this series of experiments are as indicated in Table A.

TABLE A

| Soft Segment (Macroglycol) Chemical Structure | | Percent Soft Segment By Wt. | Soft Segment Solubility Parameter |
|---|---|---|---|
| TPU-1 | Polycaprolactone | 60 | 9.2 |
| TPU-2 | Polytetramethylene Glycol Ether | 58 | 8.1 |
| TPU-3 | Polycaprolactone/Poly Propylene Oxide Ether in a 50:50 weight ratio | 60 | 9.2/7.7 |
| TPU-4 | Polybutylene Adipate | 60 | 9.3 |
| TPU-5 | Polycaprolactone | 50 | 9.2 |
| TPU-6 | Polycaprolactone | 67 | 9.2 |

TABLE A-continued

| | Soft Segment (Macroglycol) Chemical Structure | Percent Soft Segment By Wt. | Soft Segment Solubility Parameter |
|---|---|---|---|
| TPU-7 | Polyprolactone | 42 | 9.2 |
| TPU-8 | Polycaprolactone | 30 | 9.2 |
| TPU-9 | Polycaprolactone | 39 | 9.2 |

TABLE II

| Sample | Composition (Weight Percent) | TPU Soft Segment Type | TPU Shore Hardness Rating | Notched Izod Impact Strength[2] (ft.-lbs/inch of notch) | | | |
|---|---|---|---|---|---|---|---|
| | | | | Room Temp. | −10° F. | −20° F. | −30° F. |
| Example 2 | 55% ABS-2 45% TPU-1 | Polyester | 80A | — | — | 19.5 | 14.5 |
| Example 3 | 55% ABS-2 45% TPU-4 | Polyester | 80A | — | 19.6 | 9.3 | — |
| Example 4 | 50% ABS-2 50% TPU-1 | Polyester | 80A | No Break | — | 23.8 | 23.0 |
| Example 5 | 20% ABS-2 80% TPU-1 | Polyester | 80A | — | — | — | 27.9 |
| Example 6 | 40% ABS-2 60% TPU-1 | Polyester | 80A | — | — | 32.0 | 31.7 |
| Example 7 | 47% ABS-2 38% TPU-1 15% PMMA-GRC[1] | Polyester | 80A | No Break | — | — | 13.9 |
| Example 8 | 55% ABS-2 45% TPU-6 | Polyester | 75A | — | — | 26.0 | 27.1 |
| Example 9 | 60% ABS-2 40% TPU-1 | Polyester | 80A | — | 17.8 | 13.5** | — |
| Experiment A | 100% ABS-2 | None | — | 4.6 | — | 1.9* | — |
| Experiment B | 55% ABS-2 45% TPU-7 | Polyester | 55D | 10.3 | — | 1.3* | — |
| Experiment C | 55% ABS-2 45% TPU-8 | Polyester | 80D | 1.8* | — | 1.1* | — |
| Experiment D | 80% ABS-2 20% TPU-1 | Polyester | 80A | — | 3.1* | 3.8* | — |
| Experiment E | 55% ABS-2 45% TPU-9 | Polyester | 65D | 1.7* | 0.7* | — | — |
| Experiment F | 55% ABS-2 45% TPU-2 | Polyether | 80A | 12.0 | 7.0 | 3.4* | — |
| Experiment G | 55% ABS-2 45% TPU-3 | 50:50 Mixed Polyether/ Polyester | 80A | 8.2 | 6.0 | 4.7* | — |
| Experiment H | 55% ABS-2 45% TPU-5 | Polyester | 90A | 25.7 | 6.3 | 4.5* | — |

[1]PMMA-GRC = An emulsion graft polymerized impact modifier containing about 70 percent of 0.1 micron (volume average) butadiene rubber particles grafted with polymethylmethacrylate at a graft to rubber weight ratio of 0.3:1.
[2]ASTM D-256
*connotes brittle failure mode.
**4 Ductile (15.9/Izod Average)/1 Brittle (3.8/Izod)-Ductile/Brittle transition temperature.

While the subject matter hereof has been herein described and illustrated by reference to certain specific embodiments and examples thereof, such is not to be in any way interpreted as limiting the scope of the instantly claimed invention.

What is claimed is:

1. A polymer blend composition comprising (A) from about 20 to about 65 weight percent of a rubber modified monovinylidene aromatic/ethylenically unsaturated nitrile/N-arylmaleimide copolymer which contains, on a rubber modified copolymer weight basis, from about 3 to about 40 weight percent of dispersed rubbery polymer particles and (B) from about 35 to about 80 weight percent of an elastomeric polyester-based thermoplastic polyurethane having a polycaprolactone or polybutylene adipate-based soft segment content of at least about 50 weight percent on an elastomeric thermoplastic polyurethane weight basis and having a Shore Hardness rating of less than 90 on the A scale.

2. The polymer blend composition of claim 1 wherein the rubber modified monovinylidene aromatic/ethylenically unsaturated nitrile/N-arylmaleimide copolymer comprises:

(a) a graft copolymer comprising, in polymerized form and on a graft copolymer weight basis, from about 55 to about 99 weight percent of a monovinylidene aromatic monomer, from about 1 to about 45 weight percent of an ethylenically unsaturated nitrile monomer and from 0 to about 35 weight percent of an N-arylmaleimide monomer, said graft copolymer being grafted to the dispersed rubbery polymer particles of said rubber modified copolymer; and (b) a matrix polymer comprising in polymerized form and on a matrix polymer weight basis, from about 55 to about 97 weight percent of a monovinylidene aromatic monomer, from about 1 to about 45 weight percent of an ethylenically unsaturated nitrile monomer and from about 2 to about 35 weight percent of an N-arylmaleimide monomer.

3. The polymer blend composition of claim 2 wherein the rubber modified monovinylidene aromatic/ethylenically unsaturated nitrile/N-arylmaleimide copolymer comprises from about 5 to about 35 weight percent of said dispersed rubbery polymer particles on a rubber modified monovinylidene aromatic/ethylenically unsaturated nitrile/N-arylmaleimide copolymer weight basis.

4. The polymer blend composition of claim 3 wherein the rubbery substrate polymer is a homopolymer of 1,3-butadiene or a copolymer thereof with up to about 40 weight percent, on a rubbery substrate polymer weight basis, of one or more comonomers selected from the group consisting of monovinylidene aromatic monomers, ethylenically unsaturated nitrile monomers and alkyl acrylate or methacrylate monomers.

5. The polymer blend composition of claim 1 wherein the rubber modified monovinylidene aromatic/ethylenically unsaturated nitrile/N-arylmaleimide copolymer is prepared by mass, solution, mass/suspension or mass/solution polymerization techniques.

6. The polymer blend composition of claim 5 wherein said composition further comprises, on a total composition weight basis, from 1 to about 30 weight percent of an emulsion polymerized grafted rubber concentrate ingredient.

7. The polymer blend composition of claim 6 wherein the emulsion polymerized graft copolymer comprises dispersed rubbery particles having a volume average particle size of from about 0.03 to about 1.5 micron and wherein the mass, solution, mass/suspension or mass/solution polymerized rubber modified copolymer comprises dispersed rubbery particles having a volume average particle size of from about 0.4 to about 6 microns.

8. The polymer blend composition of claim 1 wherein the polyester-based elastomeric thermoplastic polyurethane has a Shore A hardness rating of about 85 or less and has a polycaprolactone or polybutylene adipate-based soft segment content of from about 55 to about 75 weight percent.

9. The polymer blend composition of claim 1 wherein the elastomeric thermoplastic polyurethane is based at least in part upon 4,4'-methylene bis (phenyl isocyanate).

10. The polymer blend composition of claim 1 wherein the polycaprolactone or polybutylene adipate-based soft segment of the thermoplastic polyurethane has a molecular weight of from about 500 to about 5,000.

11. The polymer blend composition of claim 1 wherein the thermoplastic polyurethane soft segment is polycaprolactone.

12. The polymer blend composition of claim 1 wherein the thermoplastic polyurethane soft segment is polybutylene adipate.

13. The polymer blend composition of claim 1 wherein there is a mixture of both polyether polyol and polycaprolactone and/or polybutylene adipate polyol soft segments in the thermoplastic polyurethane and wherein said polycaprolactone and/or polybutylene adipate polyol component constitutes more than 50 weight percent of the total soft segment content thereof.

14. The polymer blend composition of claim 1 wherein the polycaprolactone or polybutylene adipate-based soft segment of the thermoplastic polyurethane has a molecular weight of from about 1,000 to about 3,000.

15. The polymer blend composition of claim wherein the matrix polymer portion of the rubber modified monovinylidene aromatic/ethylenically unsaturated nitrile/N-arylmaleimide copolymer has a solubility parameter of from about 9.0 to about 10.2 cal$^{\frac{1}{2}}$/mole cm$^{3/2}$.

16. The polymer blend composition of claim 15 wherein the polycaprolactone or polybutylene adipate-based soft segment of the elastomeric thermoplastic polyurethane has a solubility parameter of from about 8.7 to 10.2 cal$^{\frac{1}{2}}$/mole cm$^{3/2}$.

17. The polymer blend composition of claim 16 wherein the solubility parameter ratio as between the matrix polymer of the monovinylidene aromatic/ethylenically unsaturated nitrile/N-arylmaleimide copolymer and the polycaprolactone or polybutylene adipate-based soft segment of the elastomeric thermoplastic polyurethane is from about 1.00:0.88 to about 1.00:1.17.

18. The polymer blend composition of claim 1 wherein the polyester-based thermoplastic polyurethane constitutes from about 40 to about 60 weight percent of said polymer blend composition.

19. The polymer blend composition of claim 1 wherein the rubber modified monovinylidene aromatic/ethylenically unsaturated nitrile/N-arylmaleimide copolymer constitutes from about 40 to about 60 weight percent of said polymer blend composition.

* * * * *

UNITED STATES PATENT AND TRADEMARK OFFICE
CERTIFICATE OF CORRECTION

PATENT NO. : 5,194,494

DATED : March 16, 1993

INVENTOR(S) : David E. Henton, et al.

It is certified that error appears in the above-identified patent and that said Letters Patent is hereby corrected as shown below:

In Col. 14, line 17, "composition of claim wherein" should correctly appear as --composition of claim 2 wherein--.

Signed and Sealed this

Fourth Day of January, 1994

*Attest:*

BRUCE LEHMAN

*Attesting Officer*　　　　*Commissioner of Patents and Trademarks*